(12) United States Patent
Devilbiss et al.

(10) Patent No.: US 9,628,374 B1
(45) Date of Patent: Apr. 18, 2017

(54) ETHERNET LINK AGGREGATION WITH SHARED PHYSICAL PORTS

(71) Applicant: International Business Machines Corporation, Armonk, NY (US)

(72) Inventors: Colin R. Devilbiss, Rochester, MN (US); Charles S. Graham, Rochester, MN (US); Timothy J. Schimke, Stewartville, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/000,468

(22) Filed: Jan. 19, 2016

(51) Int. Cl.
*H04L 12/709* (2013.01)
*H04L 12/741* (2013.01)
*H04L 12/935* (2013.01)

(52) U.S. Cl.
CPC .......... *H04L 45/245* (2013.01); *H04L 45/74* (2013.01); *H04L 49/30* (2013.01)

(58) Field of Classification Search
None
See application file for complete search history.

(56) References Cited

U.S. PATENT DOCUMENTS

| | | | |
|---|---|---|---|
| 6,195,351 B1 | 2/2001 | Hiscock et al. | |
| 6,385,197 B1 | 5/2002 | Sugihara | |
| 7,173,934 B2 | 2/2007 | Lapuh et al. | |
| 7,274,694 B1 | 9/2007 | Cheng et al. | |
| 7,697,525 B2 | 4/2010 | Zelig et al. | |
| 2002/0103921 A1 | 8/2002 | Nair et al. | |
| 2007/0268903 A1 | 11/2007 | Nakagawa | |
| 2008/0089235 A1* | 4/2008 | Kotrla | H04L 41/0659 370/242 |
| 2010/0115174 A1* | 5/2010 | Akyol | G06F 13/385 710/316 |
| 2011/0243032 A1* | 10/2011 | Jenne | H04L 12/12 370/254 |
| 2011/0292807 A1* | 12/2011 | Shah | H04W 24/02 370/237 |
| 2012/0087372 A1* | 4/2012 | Narasimhan | H04L 45/245 370/392 |
| 2014/0006822 A1* | 1/2014 | Diab | G06F 1/3206 713/322 |
| 2014/0040459 A1* | 2/2014 | Agrawal | H04L 45/14 709/224 |
| 2014/0362736 A1* | 12/2014 | Ramanathan | H04L 12/24 370/254 |
| 2015/0003459 A1 | 1/2015 | Narasimhan | |

(Continued)

*Primary Examiner* — Diane Lo
(74) *Attorney, Agent, or Firm* — Patterson + Sheridan, LLP

(57) ABSTRACT

Techniques are disclosed for providing Ethernet link aggregation for logically independent entities that share a plurality of physical ports. A client operating system (OS) executing in a host computing system receives a selection of two or more logical Ethernet ports. Each logical Ethernet port is assigned to one of a plurality of physical Ethernet ports of a network adapter. The client OS generates a first link aggregate from the logical Ethernet ports. System firmware assigns an identifier to the first link aggregate that associates an aggregate configuration with the first link aggregate. The firmware registers the aggregate configuration with a network device that maintains configurations of at least a second link aggregate.

20 Claims, 7 Drawing Sheets

(56) References Cited

U.S. PATENT DOCUMENTS

2015/0244542 A1    8/2015  Finn
2016/0065407 A1*  3/2016  Saltsidis ............ H04L 41/0806
                                                              370/255

* cited by examiner

ETHERNET LINK AGGREGATION WITH SHARED PHYSICAL PORTS

BACKGROUND

Embodiments presented herein generally relate to Ethernet link aggregation, and more specifically, to providing link aggregation over multiple logical Ethernet ports.

Generally, link aggregation bonds multiple physical network interface ports of a network device, such as a switch, to a single logical port. When bonded, a link aggregate (i.e., the multiple network interfaces) appears to link partners (e.g., a host computer and a switch) as a single network interface. For example, the link aggregate is associated with its own Media Access Control (MAC) address mapped to each linked physical network interface. Link aggregation provides increased throughput, redundancy, fault tolerance, and load balancing in a computer network, such as in a cloud computing environment.

Currently, link aggregation techniques also allow multiple logical ports to be bonded with one another, i.e., share a single physical network interface port. For example, such techniques may be adapted in a single-root I/O virtualization (SR-IOV) architecture. In an SR-IOV architecture, a PCIe device, such as a network adapter, can separate access to resources using physical functions (PFs) and virtual functions (VFs), which allow the network adapter to appear to be multiple distinct network adapters. As a result, an SR-IOV architecture may allow logically independent entities, e.g., virtual machines executing on a given host, to share a physical link with one another. For example, a virtual machine may create, via SR-IOV, multiple logical ports from different physical ports of a network adapter and bond the logical ports together using link aggregation. Another virtual machine on the host may similarly aggregate logical ports using such methods.

However, aggregating logical ports may cause issues with the link partner that has the physical ports, usually a switch. For instance, the switch is generally unaware of any logical ports beyond one on a given physical port. For example, assume that a virtual machine X, assigns a logical port A to a first physical port, assigns a logical port B to a second physical port, and creates a link aggregate AB from the logical ports. Further, assume that a virtual machine Y assigns a logical port C to the first physical port, assigns a logical port D to the second physical port, and creates a link aggregate CD from the logical ports. Also assume that the switch aggregates the first and second physical ports. In such a case, the aggregation scheme operates normally, provided that all logical ports are active (or if logical ports A and B are both down, or if logical ports C and D are both down). However, if a single logical port goes offline, the switch may be unable to deliver a given frame to its intended destination. Continuing the previous example, assume that logical port D becomes inactive. In such a case, the switch would not recognize that frames targeted towards logical aggregate CD need to be sent to only the first physical port. That is, frames sent to the second physical port will only be received at logical port B, and thus not by virtual machine Y.

SUMMARY

One embodiment presented herein discloses a method for providing Ethernet link aggregation for logically independent entities that share a plurality of physical ports. This method generally includes receiving a selection of two or more logical Ethernet ports. Each logical Ethernet port is assigned to one of a plurality of physical Ethernet ports of a network adapter. A first link aggregate is generated from the selected two or more logical Ethernet ports. An identifier is assigned to the first link aggregate. The identifier associates an aggregate configuration with the first link aggregate. The aggregate configuration is registered with a network device that maintains configurations of at least a second link aggregate.

Another embodiment presented herein discloses a computer program product that includes a non-transitory computer-readable storage medium storing instructions, which, when executed on a processor, perform an operation for providing Ethernet link aggregation for logically independent entities that share a plurality of physical ports. The operation itself generally includes receiving a selection of two or more logical Ethernet ports. Each logical Ethernet port is assigned to one of a plurality of physical Ethernet ports of a network adapter. A first link aggregate is generated from the selected two or more logical Ethernet ports. An identifier is assigned to the first link aggregate. The identifier associates an aggregate configuration with the first link aggregate. The aggregate configuration is registered with a network device that maintains configurations of at least a second link aggregate.

Yet another embodiment presented herein discloses a system that includes a processor, a network adapter having a plurality of physical Ethernet ports, and a memory storing code, which, when executed on the processor, performs an operation for providing Ethernet link aggregation for logically independent entities that share a plurality of physical ports. The operation itself generally includes receiving a selection of two or more logical Ethernet ports. Each logical Ethernet port is assigned to one of a plurality of physical Ethernet ports of a network adapter. A first link aggregate is generated from the selected two or more logical Ethernet ports. An identifier is assigned to the first link aggregate. The identifier associates an aggregate configuration with the first link aggregate. The aggregate configuration is registered with a network device that maintains configurations of at least a second link aggregate.

DETAILED DESCRIPTION

Figure 1:
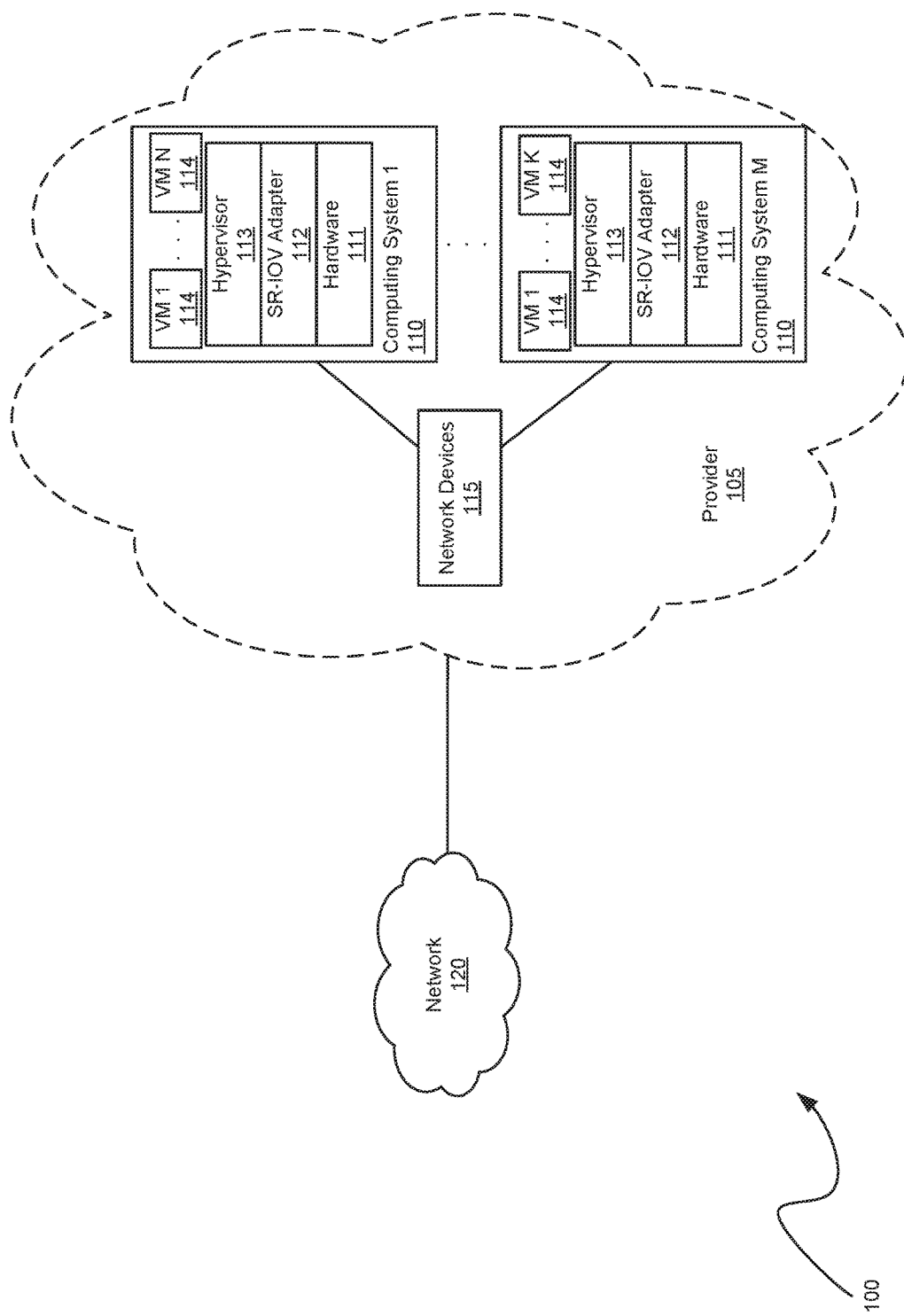
FIG. 1 illustrates an example computing environment, according to one embodiment.

Embodiments presented herein describe techniques for aggregating multiple logical Ethernet ports across physical ports of a network device, such as a switch. More specifically, firmware on a host computing system may assign a distinct identifier to each aggregate of logical ports. Further, the firmware registers the aggregate information (e.g., logical ports associated with the aggregate, the aggregate identifier, etc.) with a link partner in the aggregation scheme, such as a network switch. In one embodiment, a client operating system (OS) of a virtual machine instance executing in the host then includes the distinct identifier into each frame sent from logical ports associated with the aggregate. Further, a link aggregation protocol (e.g., Link Aggregation Control Protocol (LACP)) in the client OS and the switch may be configured such that both the client OS and switch can recognize and associate the identifier with the aggregate. The switch is configured to tolerate negotiation of multiple independent logical aggregates on a given physical port. Further, the switch is also configured to maintain associations between each media access control (MAC) address and logical ports associated with an aggregate, based on the identifier.

In one embodiment, techniques are adaptable in a single-root I/O virtualization (SR-IOV) architecture. As described above, SR-IOV allows PCIe devices of a host computing system to separate access to resources into physical functions (PFs) and (VFs) that can be mapped to logically independent entities (e.g., VMs), as if each entity had its own distinct PCIe device. For instance, an SR-IOV adapter may interface with a network adapter and create VFs for port functionality that VMs can use for transferring data over a network. Doing so allows the VMs to communicate directly with the underlying network adapter, bypassing intermediate communications with a hypervisor.

In addition, a VM may generate, via the SR-IOV adapter, logical ports to communicate with individual physical ports of the adapter. Further, the VM may bond the logical ports using various techniques (e.g., Link Aggregation Control Protocol (LACP), etc.) to create an aggregate that effectively causes the logical ports to appear as a single network interface port. In a given host computing system, multiple VMs may take advantage of link aggregation techniques to bond logical ports though an SR-IOV adapter. However, a typical network switch is unaware of an aggregate in the SR-IOV architecture. Thus, if a logical port associated with a given VM fails, then the switch may still direct an incoming frame towards the physical port associated with that logical port, which potentially results in the VM not receiving the frame. Therefore, an approach that allows the traffic to be rerouted to working ports (so that the VM receives the frame) is desirable.

In one embodiment, the link aggregation protocol used by both the client OS and the switch per physical link may be extended to associate an aggregate identifier with a given logical aggregate. A client OS, when generating a link aggregate based on shared physical ports of a SR-IOV-enabled network adapter, registers aggregate information with the switch, such as logical ports associated with the aggregate, a MAC address associated with the aggregate, and so on. The client OS then includes the aggregate identifier in each outgoing frame, e.g., inside a VLAN tag header for the frame. Doing so allows the switch to easily track frames being sent to and from a given logical link aggregate at each physical port of the SR-IOV network adapter.

Further, in one embodiment, the system firmware (e.g., the hypervisor) may send, via the link aggregation protocol, a negative acknowledgement to the switch indicating that a logical port associated with a given aggregate identifier is inactive. Doing so allows the switch to redirect incoming frames that are addressed to the aggregate away from the inactive logical port (i.e., to active logical ports associated with the aggregate). The switch may resume sending frames towards a previously inactive logical port after the client OS performs a series of positive advertisements on behalf of the logical port (based on the link aggregation protocol) to indicate that the logical port has resumed activity.

Advantageously, assigning an identifier to each logical aggregate associated with shared physical ports of a network adapter (e.g., an SR-IOV-enabled network adapter) allows link aggregates of logical ports to benefit from the advantages of physical link aggregation, e.g., optimal throughput, fault tolerance, and the like. That is, by extending link aggregation protocols such that link partners (e.g., network switches) are configured to recognize the logical link aggregates based on the identifier, the link partner can effectively direct frames towards the appropriate aggregate, even if one or more logical ports associated with the aggregate are currently inactive.

FIG. 1 illustrates an example computing environment 100, according to one embodiment. As shown, the computing environment 100 includes a provider network 105 that is interconnected with a network 120. In one embodiment, the network 120 is the Internet. The provider network 105 includes one or more computing systems 1-M 110, each interconnected with network devices 115. Further, each computing system 110 includes hardware 111, a single-root I/O virtualization-enabled (SR-IOV) network adapter 112, a hypervisor 113, and one or more virtual machines (VMs) 1-N (1-K) 114. In one embodiment, the provider network 105 represents a cloud provider environment, where each computing system 110 provides sharable physical resources (e.g., processing, storage capacity, network functionality, etc.) for a user base.

For instance, each computing system 110 may spawn, using the hypervisor 113, a number of VMs 114 that can belong to a number of independent entities (e.g., enterprises, organizations, individual users, etc.). The hypervisor 113 represents computer firmware for the computing system 110 that manages the execution of the VMs 114, e.g., by managing physical resource allocation, accessing physical resources on behalf of a given VM 114, etc.

The SR-IOV network adapter 112 provides an interface between the computing system 110 and the network devices 115. In one embodiment, the SR-IOV network adapter 112 provides physical functions (PFs) and virtual functions (VFs) consistent with SR-IOV standards. PFs include full-featured PCIe device functions that provide a full configuration space for the SR-IOV network adapter 112. PFs may configure and control the SR-IOV network adapter 112 (e.g., exposing VFs to VMs), as well as move data in and out of the SR-boy network adapter 112. VFs are lightweight PCIe functions that represent a virtualized instance of the SR-IOV network adapter 112. Each VF shares one or more physical resources on the SR-IOV network adapter 112 with other PFs and VFs, such as network ports of the adapter.

Through VF instances of the SR-IOV network adapter 112, the VMs 114 may access physical resources of the network adapter 112 such that each VM 114 appears to have its own distinct network adapter. As a result, the VM 114 can perform actions to the physical network adapter via the VF instance. For example, the hypervisor 113 may generate logical ports from the physical ports of the SR-IOV network adapter 112 and assign one or more of the logical ports to a given VM 114. In addition, the VM 114 may, using link aggregation techniques (e.g., Link Aggregation Control Protocol (LACP), etc.), bond the logical ports together, such that the logical ports appear as a single port.

In one embodiment, the network devices 115 may include a network switch that connects the computing systems 110 with one another in the provider network 105 via physical ports of the switch and of a network adapter 112. Such a network device 115 is configured to support a link aggregation standard, such as LACP, with the computing systems 110 per physical link. These standards allow the network device 115 to communicate properly with physical link aggregates in the computing system 110. However, the network device 115 is generally unaware of aggregates of logical ports created by the VMs. That is, although the network device 115 may still direct network frames addressed to a given logical link aggregate associated with a given physical port, the network device 115 is typically only aware of a first logical port associated with the physical link in the aggregate (i.e., and no other logical ports that may be associated with the aggregate). As a result, in the event that a logical port becomes inactive (e.g., due to error-handling mechanisms that force the logical port to temporarily go offline), network frames that are received at a physical port (that is associated with the inactive logical port) might not reach the intended VM 114.

Figure 2:
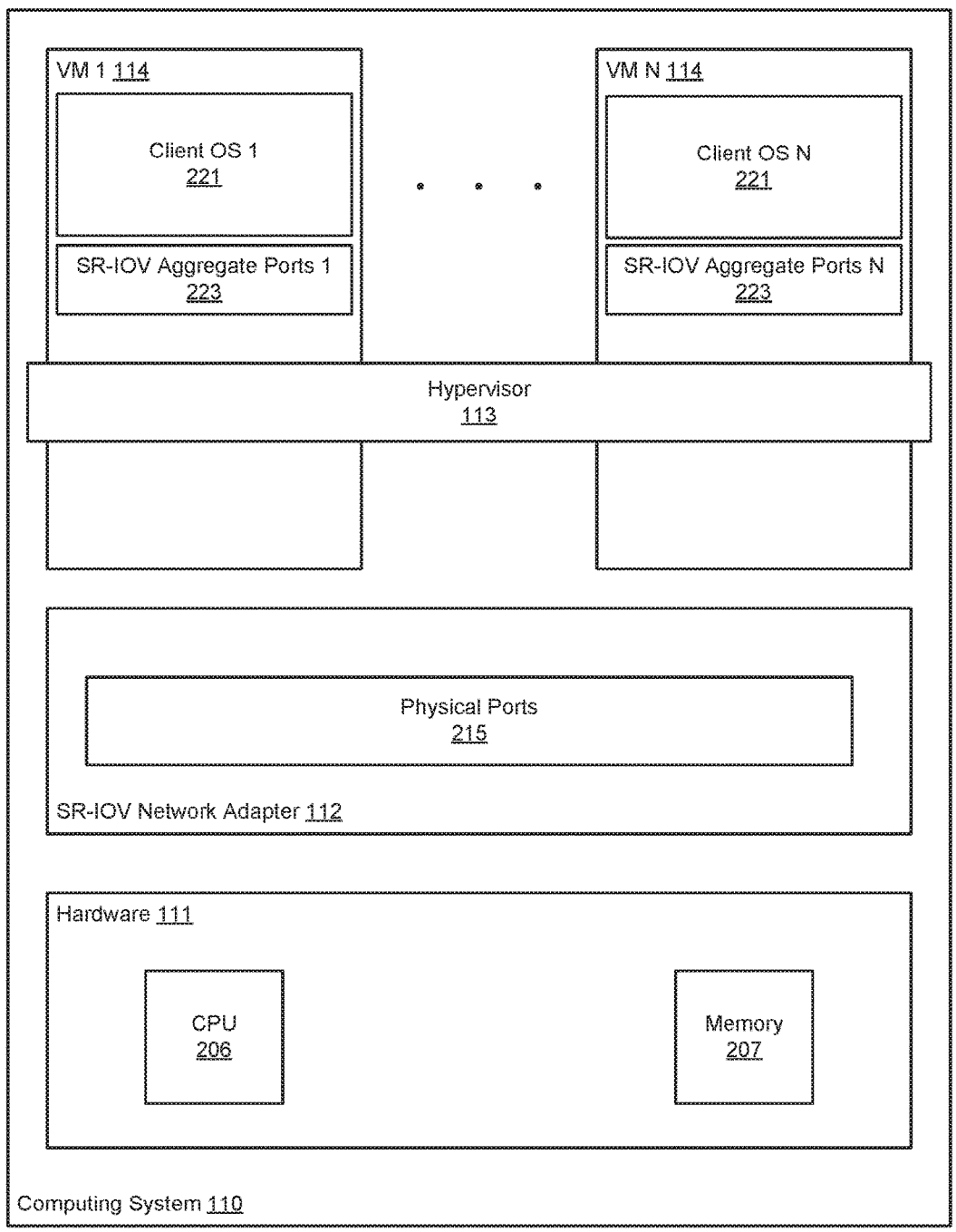
FIG. 2 further illustrates the computing system described relative to FIG. 1, according to one embodiment.

To address this issue, the link aggregation protocol shared between the network device 115 and a client OS of a VM 114 may be extended to carry logical link aggregate metadata, e.g., a distinct identifier assigned to a given aggregate, in each frame passing transmitting within the aggregate. FIG. 2 further illustrates an example computing system 110 configured to provide link aggregation with physical ports shared by multiple independent logical entities, according to one embodiment. As shown, the hardware 111 includes a central processing unit 206 and a memory 207. The SR-IOV network adapter 112 includes one or more physical ports 215. Each VM 1-N 114 includes a respective client operating system (OS) 221 and one or more SR-IOV logical ports 223. As stated above, the SR-IOV network adapter 112 allows multiple independent entities, e.g., VMs 114, to access shared physical resources of the network adapter 112, such as physical ports 215.

The CPU 206 is representative of a single CPU, multiple CPUs, a single CPU having multiple processing cores, and the like. Similarly, memory 207 may be a random access memory. While the memory 207 is shown as a single identity, it should be understood that the memory 207 may comprise a plurality of modules, and that the memory 207 may exist at multiple levels, from high speed registers and caches to lower speed but larger DRAM chips.

The hypervisor 113 supports multiple virtual machine execution spaces, where a VM process can be executed to instantiate corresponding VMs 114. For each VM 114, the hypervisor 113 manages a corresponding virtual hardware platform that includes emulated hardware, such as virtual CPUs and memory. In addition, the hypervisor 113 may create and assign one or more logical ports 223 from physical ports 215 to each VM 114. Each logical port 223 may be associated with a given physical port 215 on the SR-IOV network adapter 112. In each VM 114, the corresponding client OS 221 provides user-level applications running in the virtual machine. Further, the VM 114 may aggregate its logical ports (e.g., using techniques such as LACP) to provide fault tolerance and load balancing support for network connections of the VM 114.

In one embodiment, the hypervisor 113 maintains configuration information for each aggregate, such as logical ports associated with the aggregate, a media access control (MAC) address assigned to the aggregate, and the like. Further, the configuration information also includes an aggregate identifier. The aggregate identifier is a value that is distinct across other logical link aggregates owned by other VMs 114 executing in the computing system 110. When a given client OS 221 creates a link aggregate from one or more logical ports, the client OS 221 assigns an aggregate identifier and registers the identifier with the hypervisor 113. The hypervisor 113 also registers the configuration information with the network device 115.

In one embodiment, in each outgoing frame sent from a given link aggregate, the client OS 221 inserts the identifier associated with the aggregate. The client OS 221 does so as part of the link aggregation protocol. For example, the client OS 221 may insert the identifier in a specified position of a VLAN tag header of the frame. Because the network device 115 has configuration information corresponding to that aggregate, the network device 115 can identify the link aggregate associated with the frame by evaluating the VLAN tag header.

In one embodiment, the hypervisor 113 may periodically determine liveness (i.e., live operational state) information of each logical port maintained by the VMs 114. As a result, the hypervisor 113 detects when a logical port becomes inactive (e.g., due error-handling measures in the SR-IOV network adapter 112 that cause the logical port to temporarily go offline). If detected, the hypervisor 113 may send a negative acknowledgement (NAK) to the network device 115 that includes the aggregate identifier and the physical port 215 associated with the logical port. Doing so results in the network device 115 sending frames directed at the logical aggregate to another logical port associated with the aggregate (as identified based on the aggregate identifier).

Figure 3:
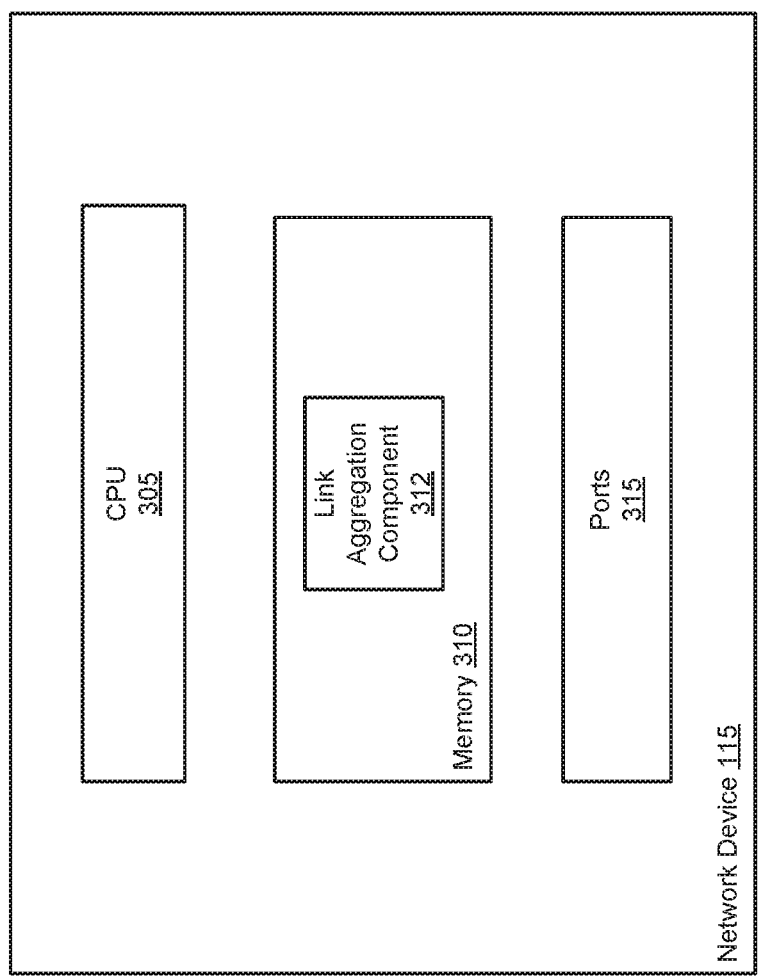
FIG. 3 further illustrates the network device described relative to FIG. 1, according to one embodiment.

FIG. 3 illustrates an example network device 115 configured to provide link aggregation with physical network adapter ports shared by multiple independent logical entities, according to one embodiment. As shown, the network device 115 includes a CPU 305, a memory 310, and ports 315 (e.g., Ethernet ports). In one embodiment, the network device 115 is representative of a switch that connects multiple computing systems 110 with one another. Of course, the network device 115 may include additional components, and the components described herein are only for explanatory purposes.

The CPU 305 retrieves and executes programming instructions stored in the memory 310. Note, the CPU 305 is included to be representative of a single CPU, multiple CPUs, a single CPU having multiple processing cores, and the like. The CPU 305 is responsible for switching tasks, such as receiving, processing, and forwarding network frames to a destination device. The CPU 305 typically accomplishes functions under the control of software including, e.g., an operating system and any appropriate applications stored in the memory 310. Memory 310 is included to be generally representative of a random access memory. The ports 315 provide physical links to connect with ports of a network adapter (e.g., SR-IOV network adapter 112).

Illustratively, the memory 310 includes a link aggregation component 312. The link aggregation component 312 carries out a specified link aggregation protocol with a link partner (e.g., a client OS of a VM executing in a computing system 110), such as LACP. In one embodiment, the specified protocol is extended to recognize and handle aggregate configuration information associated with logical aggregates. In one embodiment, the link aggregation component 312 tolerates negotiation of multiple independent logical aggregates on the same port.

When a given client OS creates a link aggregate from logical ports associated with physical network adapter ports, the hypervisor sends the configuration associated with the link aggregate to the link aggregation component 312. As stated, the configuration may include an aggregate identifier, a MAC address associated with the aggregate, MAC addresses of the underlying network adapter physical ports, etc. In turn, the link aggregation component 312 stores the aggregate configuration. The link aggregation component 312 maintains an association between each MAC address and the logical aggregate that carries its traffic via the aggregate identifier in a frame. That is, the link aggregation component 312 may identify a given aggregate based on the identifier embedded in the frame, e.g., such as in a VLAN tag header.

Further, the link aggregation component 312 may receive a negative acknowledgement (NAK) from the hypervisor that includes an aggregate identifier and an underlying physical port of the network adapter. The negative acknowledgement indicates that a logical port for that aggregate corresponding to the physical port is currently inactive. The link aggregation component 312 may identify another logical port in the aggregate to direct frames such that the underlying client OS receives the frame. The link aggregation component 312 can resume sending frames to a previously inactive logical port after the client OS has completed a series of negotiations with the switch (based on the link aggregation protocol) indicating that the logical port is available to receive frames.

Figure 4A:
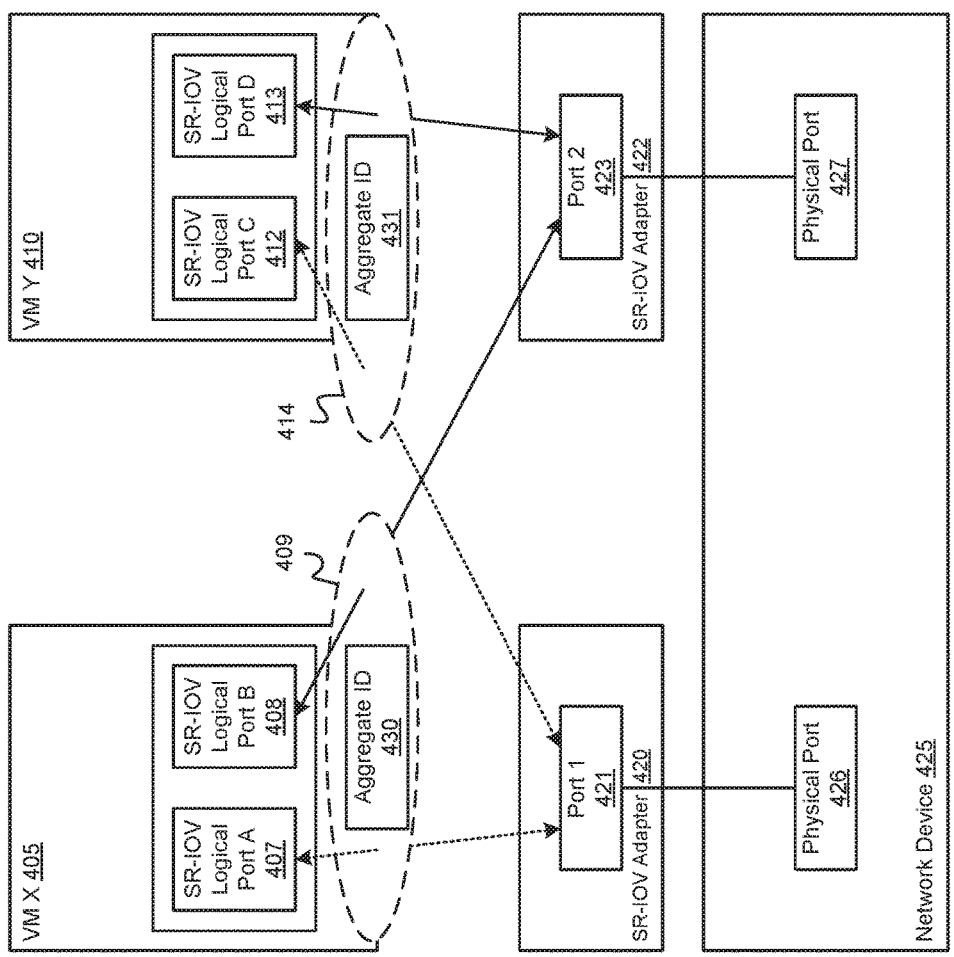
FIGS. 4A and 4B illustrate an example for providing link aggregation over multiple logical Ethernet ports.

FIG. 4A illustrates an example for providing link aggregation over multiple logical Ethernet ports. In particular, FIG. 4A depicts an example of a provider network in an operational state. As shown, FIG. 4A includes a VM X 405, a VM Y 410, an SR-IOV adapter 420, an SR-IOV adapter 422, which are representative of physical and virtual components of a host computing system. FIG. 4A also includes a network device 425, representative of an Ethernet switch. SR-IOV adapters 420 and 422 represent VF instances of an underlying SR-IOV network adapter of the computing system that are capable of communicating with VMs X 405 and Y 410. SR-IOV adapter 420 includes port 1 421, and SR-IOV adapter 422 includes a port 2 423. Port 1 421 connects with a physical port 426 in the network device 425, and port 2 connects with a physical port 427 in the network device 425.

Illustratively, the VM X 305 includes SR-IOV logical ports A 407 and B 408. The logical port A 408 is assigned to port 1 421, and the logical port B 408 is assigned to the port 2 423. Further, the logical ports A 407 and B 408 are bonded as aggregate 409. The VM Y includes SR-IOV logical ports C 412 and D 413. The logical port C 412 is assigned to port 2 423, and the logical port D 413 is assigned to port 1 421. And the logical ports C 412 and D 413 are bonded as aggregate 414. Further still, the aggregate 409 is assigned an aggregate ID 430, and the aggregate 414 is assigned an aggregate ID 431. Each of the aggregate IDs 430 and 431 represent an identifier that is unique across all other aggregates registered with the hypervisor of the computing system.

Figure 4B:
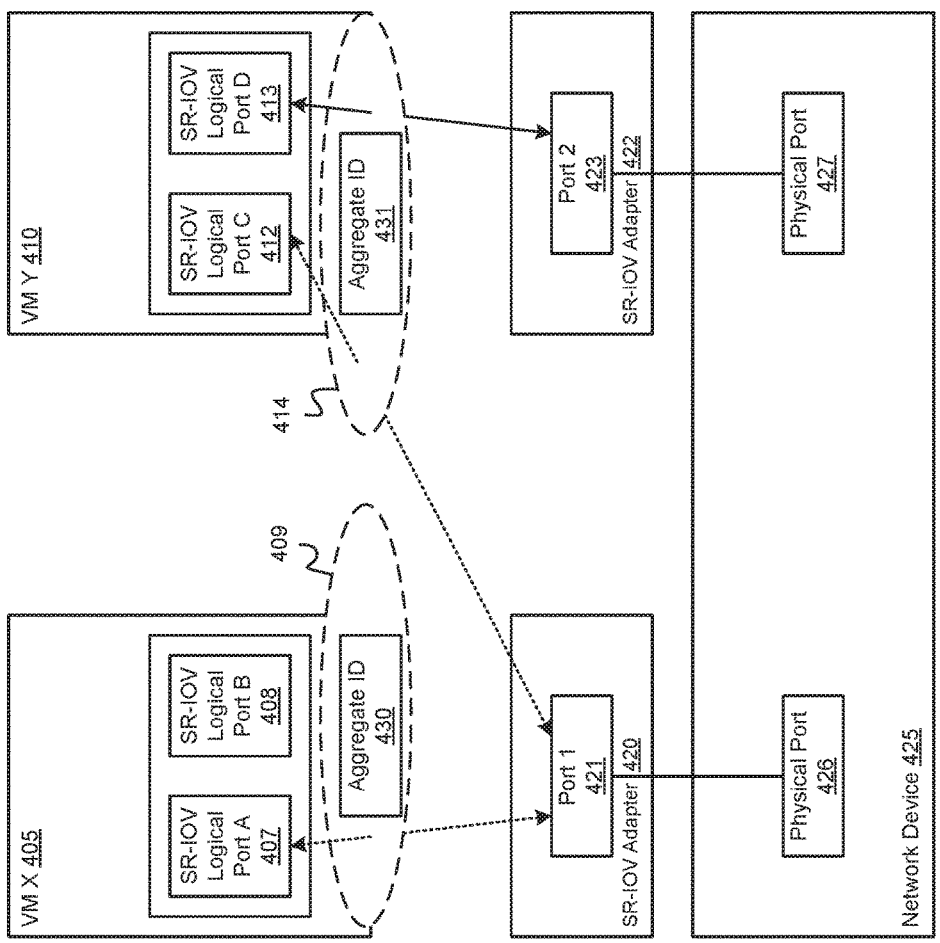

As stated, a logical port in a VM can become inactive for a variety of reasons. For example, PCIe-level failures in the underlying SR-IOV network adapter may trigger error-handling measures that require a given logical adapter to go offline. FIG. 4B depicts a scenario in which the SR-IOV logical port B 408 becomes inactive. Illustratively, the SR-IOV logical port B 408 is marked as inactive, and no traffic flows to or from the logical port B 408. In such an event, the hypervisor may send an indication to the network device 425 that the SR-IOV logical port 408 is inactive. For example, the hypervisor may send a NAK to the network device 425 that includes the aggregate ID 430 and a MAC address for port 2 423. Further, while the SR-IOV logical port B 408 is inactive, the hypervisor may send the NAK to the network device 425 at specified time intervals to indicate that the SR-IOV logical port B is offline.

If the network device 425 receives a frame targeted to the aggregate 409 while the SR-IOV logical port B is inactive, the network device 425 will forward the frame via port 1 421. The network device 425, based on the NAK, will avoid sending the frame via port 2 423. As a result, the frame is directed to SR-IOV logical port A 407 of the aggregate 409. Note, even if SR-IOV logical port B is inactive, frames targeted to aggregate 414 may still be forwarded through port 2 423. In such a case, the frame is received at logical port D 413.

Figure 5:
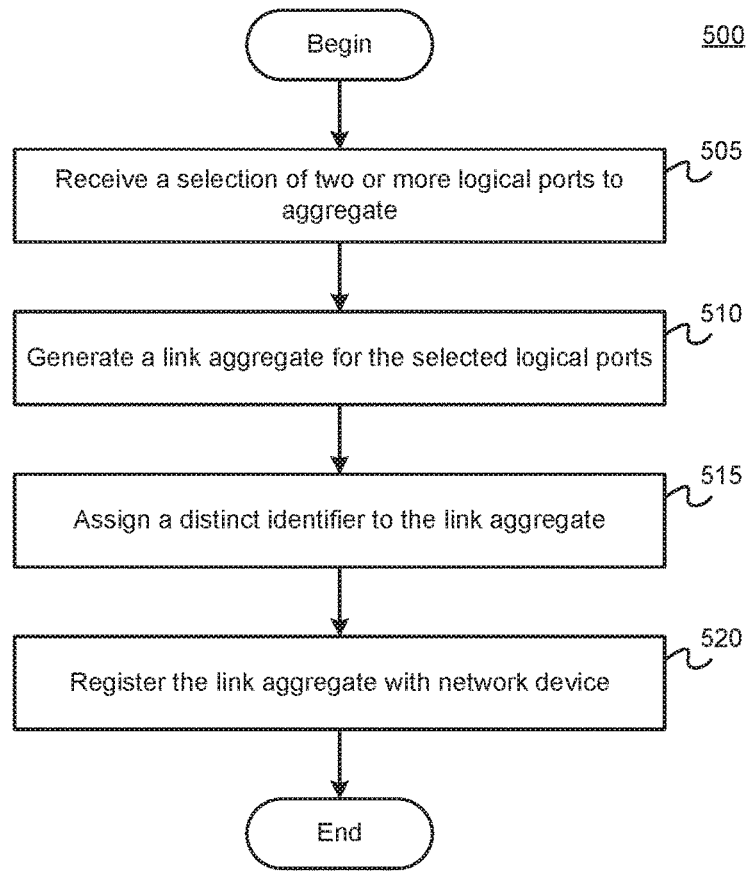
FIG. 5 illustrates a method for configuring a logical link aggregate on a network device, according to one embodiment.

FIG. 5 illustrates a method 500 for configuring a logical link aggregate on a network device, according to one embodiment. As shown, method 500 begins at step 505, where a given client OS 221 receives a selection of two or more logical ports to aggregate. Each logical port may be assigned to a given physical port in the SR-IOV network adapter 112.

At step 510, the client OS 221 generates a link aggregate for the selected logical ports. The client OS 221 does so using a specified link aggregation protocol that is also used by the network device 115, e.g., LACP. At step 515, the client OS 221 assigns a distinct identifier to the generated link aggregate. At step 520, the hypervisor 113 registers the link aggregate with the network device 115. To do so, the hypervisor 113 sends configuration information of the aggregate to the network device 115. As stated, the configuration information may include the aggregate identifier, the MAC address associated with the aggregate, logical port and network adapter port associations, and the like. In turn, the network device 115 stores the configuration.

By registering the configuration information with the network device 115, the client OS may send frames via the aggregate to the network device 115. The frames include the aggregate identifier, which allows the network device 115 to identify the aggregate and configuration information associated with the aggregate. As a result, the network device 115 can efficiently forward frames to/from the aggregate.

Figure 6:
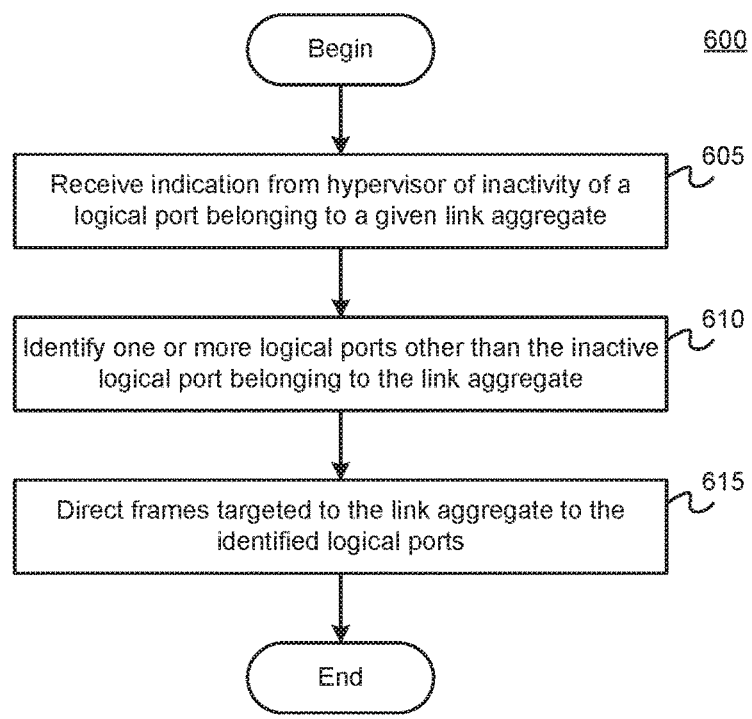
FIG. 6 illustrates a method for redirecting network frames in the case that a logical port associated with an aggregate becomes inactive, according to one embodiment.

FIG. 6 illustrates a method 600 for redirecting network frames in the case that a logical port associated with an aggregate becomes inactive, according to one embodiment. Method 600 will be discussed relative to FIG. 4B for explanatory purposes. As shown, method 600 begins at step 605, where the network device 425 receives an indication from the hypervisor that a given logical port associated with a link aggregate is inactive. As stated, the indication may be a negative acknowledgement sent by the hypervisor that includes the aggregate identifier and the underlying physical port associated with the inactive logical port. Using the scenario of FIG. 4B, the hypervisor may send a negative acknowledgement that includes the aggregate ID 409 and the physical port 2 423. The network device 425 may identify, based on the negative acknowledgment and stored aggregate configuration, that the SR-IOV logical port 408 is currently inactive.

At step 610, the network device 115 identifies one or more logical ports other than the inactive logical port that is associated with the aggregate. To do so, the network device 115 retrieves, from the configuration information of the aggregate corresponding to the aggregate ID 409, MAC address associations with the aggregate and underlying physical ports. In this case, the network device 115 identifies that the SR-IOV logical port A 407 (with the underlying port 423) as being an a logical port that can receive frames addressed to the aggregate 409.

At step 615, the network device 115 directs frames targeted to the link aggregate to the identified logical ports. Continuing the current example, when the network device 115 receives a frame that is addressed to the aggregate 409, the network device 115 forwards the frame to SR-IOV logical port A 407 via the port 423. Doing so allows the client OS of VM X 405 to receive the frame. The network device 115 may continue to direct frames toward SR-IOV logical port A 407 after a specified amount of time of having not received an indication that the SR-IOV logical port B 408 is inactive.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

Embodiments of the present disclosure may be direct to a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments presented herein. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments may be devised without departing from the basic scope thereof, and the scope thereof is determined by the claims that follow.

What is claimed is:

1. A computer-implemented method for providing Ethernet link aggregation for logically independent entities that share a plurality of physical ports, the method comprising:
   receiving a selection of two or more logical Ethernet ports, wherein each logical Ethernet port is assigned to one of a plurality of physical Ethernet ports of a network adapter;
   generating a first link aggregate from the selected two or more logical Ethernet ports;
   assigning an identifier to the first link aggregate, wherein the identifier associates an aggregate configuration with the first link aggregate;
   registering the aggregate configuration with a network device that maintains configurations of at least a second link aggregate;
   determining a live operational state of one of the selected logical Ethernet ports, wherein the one of the selected logical Ethernet ports is associated with a client operating system (OS);
   detecting, based on the determination, that the detected logical Ethernet port is inactive; and
   forwarding frames targeted to the detected logical Ethernet port to the client OS via a sideband interface associated with the client OS.

2. The method of claim 1, wherein the aggregate configuration includes the aggregate identifier and at least one of a media access control (MAC) address associated with the first link aggregate and MAC addresses of the physical Ethernet ports to which the selected logical Ethernet ports are assigned.

3. The method of claim 1, further comprising:
   upon detecting that one of the selected logical Ethernet ports is inactive, sending an indication to the network device that the detected logical Ethernet port is inactive.

4. The method of claim 3, wherein the indication is a negative acknowledgement that includes the identifier of the first link aggregate and a MAC address associated with the physical Ethernet port to which the detected logical Ethernet port is assigned.

5. The method of claim 3, further comprising:
   upon detecting that the one of the selected logical Ethernet ports resumes activity, initiating a series of positive negotiations with the network device to indicate that the detected logical Ethernet port is active.

6. The method of claim 1, wherein the first link aggregate and the second link aggregate share the plurality of physical Ethernet ports.

7. The method of claim 1, wherein the network device is a switch and wherein the network adapter supports single-root I/O virtualization (SR-IOV).

8. A computer program product, comprising:
   a non-transitory computer-readable storage medium storing instructions, which, when executed on a processor, perform an operation for providing Ethernet link aggregation for logically independent entities that share a plurality of physical ports, the operation comprising:
      receiving a selection of two or more logical Ethernet ports, wherein each logical Ethernet port is assigned to one of a plurality of physical Ethernet ports of a network adapter,
      generating a first link aggregate from the selected two or more logical Ethernet ports,
      assigning an identifier to the first link aggregate, wherein the identifier associates an aggregate configuration with the first link aggregate,
      registering the aggregate configuration with a network device that maintains configurations of at least a second link aggregate,
      determining a live operational state of one of the selected logical Ethernet ports, wherein the one of the selected logical Ethernet ports is associated with a client operating system (OS),
      upon detecting, based on the determination, that the detected logical Ethernet port is inactive, sending an indication to the network device that the detected logical Ethernet port is inactive, and
      forwarding frames targeted to the detected logical Ethernet port to the client OS via a sideband interface associated with the client OS.

9. The computer program product of claim 8, wherein the aggregate configuration includes the aggregate identifier and at least one of a media access control (MAC) address associated with the first link aggregate and MAC addresses of the physical Ethernet ports to which the selected logical Ethernet ports are assigned.

10. The computer program product of claim 8, wherein the operation further comprises:
upon detecting that one of the selected logical Ethernet ports is inactive, sending an indication to the network device that the detected logical Ethernet port is inactive.

11. The computer program product of claim 10, wherein the indication is a negative acknowledgement that includes the identifier of the first link aggregate and a MAC address associated with the physical Ethernet port to which the detected logical Ethernet port is assigned.

12. The computer program product of claim 10, wherein the operation further comprises, upon detecting that the one of the selected logical Ethernet ports resumes activity, initiating a series of positive negotiations with the network device to indicate that the detected logical Ethernet port is active.

13. The computer program product of claim 8, wherein the first link aggregate and the second link aggregate share the plurality of physical Ethernet ports.

14. The computer program product of claim 8, wherein the network device is a switch and wherein the network adapter supports single-root I/O virtualization (SR-IOV).

15. A system, comprising:
a processor;
a network adapter having a plurality of physical Ethernet ports; and
a memory storing code, which, when executed on the processor, performs an operation for providing Ethernet link aggregation for logically independent entities that share a plurality of physical ports, the operation comprising:
receiving a selection of two or more logical Ethernet ports, wherein each logical Ethernet port is assigned to one of the plurality of physical Ethernet ports,
generating a first link aggregate from the selected two or more logical Ethernet ports,
assigning an identifier to the first link aggregate, wherein the identifier associates an aggregate configuration with the first link aggregate,
registering the aggregate configuration with a network device that maintains configurations of at least a second link aggregate,
determining a live operational state of one of the selected logical Ethernet ports, wherein the one of the selected logical Ethernet ports is associated with a client operating system (OS),
upon detecting, based on the determination, that the detected logical Ethernet port is inactive, sending an indication to the network device that the detected logical Ethernet port is inactive, and
forwarding frames targeted to the detected logical Ethernet port to the client OS via a sideband interface associated with the client OS.

16. The system of claim 15, wherein the aggregate configuration includes the aggregate identifier and at least one of a media access control (MAC) address associated with the first link aggregate and MAC addresses of the physical Ethernet ports to which the selected logical Ethernet ports are assigned.

17. The system of claim 15, wherein the operation further comprises:
upon detecting that one of the selected logical Ethernet ports is inactive, sending an indication to the network device that the detected logical Ethernet port is inactive.

18. The system of claim 17, wherein the indication is a negative acknowledgement that includes the identifier of the first link aggregate and a MAC address associated with the physical Ethernet port to which the detected logical Ethernet port is assigned.

19. The system of claim 15, wherein the first link aggregate and the second link aggregate share the plurality of physical Ethernet ports.

20. The system of claim 15, wherein the network device is a switch and wherein the network adapter supports single-root I/O virtualization (SR-IOV).

* * * * *